United States Patent [19]
Agari et al.

[11] Patent Number: 5,501,528
[45] Date of Patent: Mar. 26, 1996

[54] TRACK RAIL FIXING STRUCTURE FOR LINEAR MOTION UNITS

[75] Inventors: Norimasa Agari, Seki; Hideki Kuwahara, Gifu, both of Japan

[73] Assignee: Nippon Thompson Company, Ltd., Tokyo, Japan

[21] Appl. No.: 352,048

[22] Filed: Dec. 2, 1994

[30] Foreign Application Priority Data

Dec. 24, 1993 [JP] Japan .................................. 5-346027

[51] Int. Cl.6 ................................................... F16C 29/06
[52] U.S. Cl. ............................................ 384/45; 384/55
[58] Field of Search ................... 384/45, 44, 50, 384/55, 59

[56] References Cited

U.S. PATENT DOCUMENTS

| | | | |
|---|---|---|---|
| 4,417,771 | 11/1983 | Teramachi | 384/45 |
| 4,552,416 | 11/1985 | Lehmann et al. | 384/45 |
| 5,308,167 | 5/1994 | Tsukada | 384/45 |
| 5,308,168 | 5/1994 | Yamaguchi et al. | 384/45 |

FOREIGN PATENT DOCUMENTS 5138428  6/1993  Japan .

*Primary Examiner*—Thomas R. Hannon
*Attorney, Agent, or Firm*—Browdy and Neimark

[57] ABSTRACT

This track rail fixing structure for linear motion units is capable of fixing a track rail on a mounting base without forming fixing bores in the track rail; and correcting the warpage and bend of the track rail. The track rail is provided in the portions thereof which are below raceway grooves therein with cross-sectionally arcuate grooves extending in the longitudinal direction. The mounting base is provided with a longitudinally extending track rail installation groove, in which projections extend in the longitudinal direction thereof. The track rail is set in the track rail installation groove in the mounting base, whereby the track rail is fixed on the mounting base.

7 Claims, 6 Drawing Sheets

TRACK RAIL FIXING STRUCTURE FOR LINEAR MOTION UNITS

BACKGROUND OF THE INVENTION

1. Field of the Invention

This invention relates to a track rail fixing structure for a linear motion unit in which a casing-carrying slider is formed so that the slider can be moved slidingly on a track rail, which is fixed on a mounting base, via a plurality of rolling elements.

2. Description of the Prior Art

There is a conventional linear motion rolling guide unit disclosed in Japanese Patent Laid-Open No. 138428/1993. This linear motion rolling guide unit will now be described with reference to FIGS. 12, 13 and 14.

Figure 14:
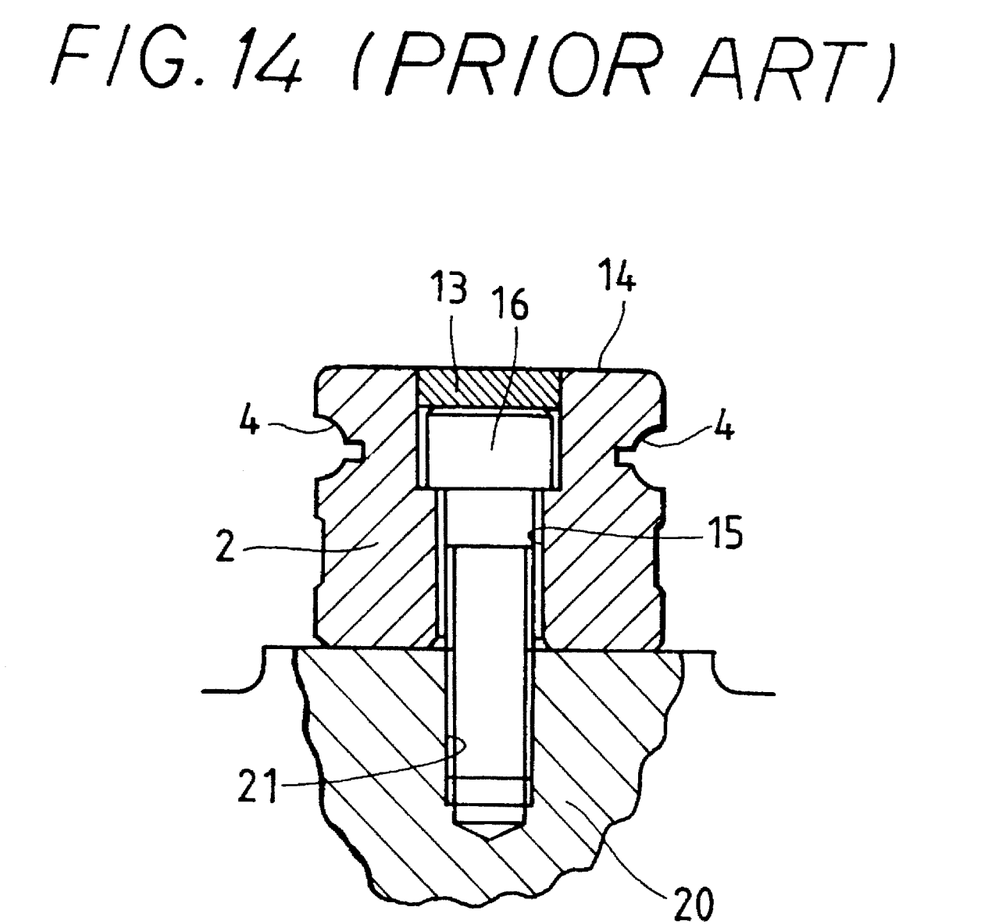
FIG. 14 is a sectional view of fixing portions of a track rail and a mounting base of the linear motion guide unit of FIG. 12.

In this linear motion rolling guide unit, raceway grooves 4 are formed in both of the longitudinal side wall surfaces 3 of a track rail 2, and a slider 1 saddles on the track rail 2 so that the slider 1 can be reciprocatingly moved. The track rail 2 is provided with a plurality of fixing bores 15 spaced from one another in the longitudinal direction thereof as shown in FIG. 14. A mounting base 20, such as a bed, a machine base or a working table for use in fixing the track rail 2 thereon is provided with threads 21. Bolts 16 are inserted into the fixing bores 15 formed in the track rail 2, and the track rail 2 can be fixed to the fixing base 20 by screwing the bolts 16 into the threads 21. Buried plugs 13 are fitted in the upper portions of the fixing bores 15 so that dust and water do not enter the same after the bolts have been inserted into the fixing bores 15.

Figure 12:
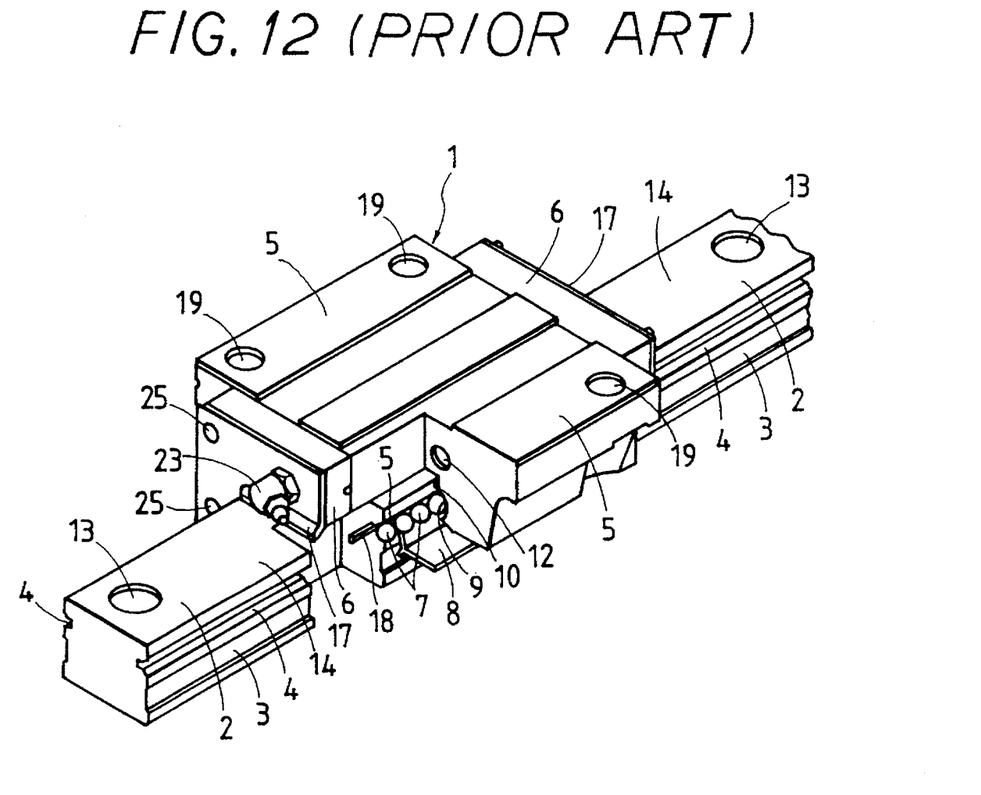
FIG. 12 is a partially cutaway view in perspective of an example of a conventional linear motion guide unit.

The slider 1 has a casing 5 movable relatively to the track rail 2 and provided with raceway grooves 9 in the portions thereof which are opposed to the raceway grooves 4 in the track rail 2, a plurality of rolling elements 7, such as balls adapted to roll in the opposed raceway grooves 4, 9, and end caps 6 fixed to both ends of the casing 5. The casing 5 is provided at its upper portion with a plurality of screw holes 19 for use in fixing a slide table (not shown) to the casing 5. The casing 5 and end caps 6 are provided in their lower surfaces with rail inserting recesses 10 so that the casing 5 and end caps 6 straddle and move along the track rail 2. In order to prevent the rolling elements 7 from coming off from the casing 5, retainer bands 18 are fixed to the casing 5 so as to surround the rolling elements 7, and, in order to effect the sealing of clearances between the track rail 2 and the lower end of the casing 5, underseals 8 are attached to the lower surface of the slider 1.

Figure 13:
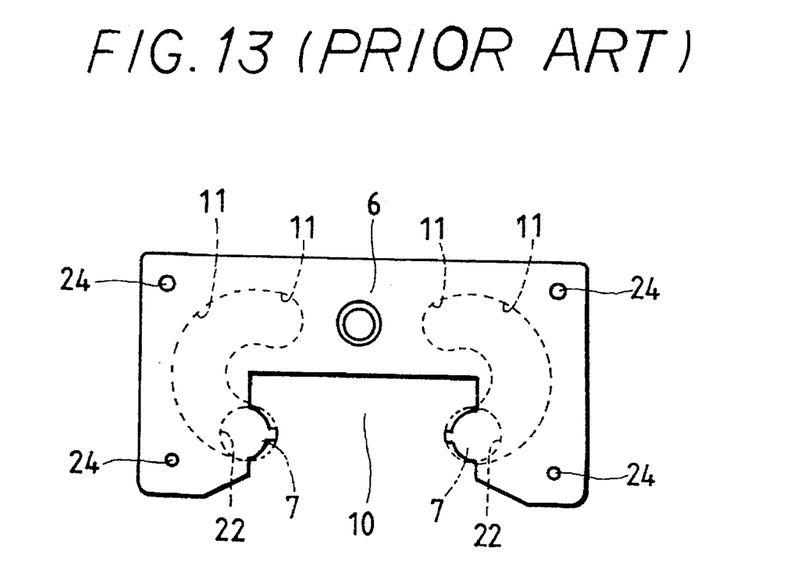
FIG. 13 is a front elevation of an end cap of the linear motion guide unit of FIG. 12.

The end caps 6 are provided at both side portions thereof with raceway grooves 22 which form slide surfaces for the rolling elements 7 between the end caps 6 and track rail 2, and direction conversion passages 11 for converting the direction of rolling of the rolling elements 7 for the circulation thereof. Side seals 17 for effecting the sealing of clearances between the track rail 2 and both of the longitudinal end portions of the slider 1 are fixed to the end caps 6, and grease nipples 23 for supplying a lubricant to the slide surfaces between the track rail 2 and slider 1 are provided thereon. The end caps 6 are fixed to both end surfaces of the casing 5 with screws 25 inserted through screw holes 24.

This linear motion rolling guide unit is constructed as described above, in which the slider 1 is placed on the track rail 2 so that the former straddles the latter, the slider 1 sliding freely via the rolling elements 7 circulating along the raceway grooves 4 in the track rail 2. The rolling elements 7 in load regions which roll in the raceway grooves 4 in the track rail 2 are guided into the direction conversion passages 11 formed in the end caps 6, and then moved to return passages 12 formed in the upper portions of the casing 5 so as to extend in parallel with the raceway grooves 9. The rolling elements 7 are thus endlessly circulated in the endless circulating passages. Owing to the rolling of the loaded rolling elements 7 positioned between the raceway grooves 9 formed in the slider 1 and those 4 formed in the track rail 2, the track rail 2 and slider 1 can be moved relatively to each other.

A conventional linear motion rolling guide unit is adapted to reciprocatingly move various types of apparatuses of comparatively large weight over a comparatively long distance with a high accuracy. However, a miniaturized linear motion rolling guide unit for moving various types of miniaturized small-weight apparatuses longitudinally has a track rail of around 5 mm in width, so that the specifications of the track rail-fixing bolts and screws 16 necessarily become not more than M2 (screw diameter of not more than 2 mm). Under the circumstances, it is troublesome to handle the bolts and screws 16, and the strength of the track rail 2 decreases due to the holes made therein for inserting the bolts and screws 16 therethrough.

SUMMARY OF THE INVENTION

A primary object of the present invention is to solve these problems, and provide a track rail fixing structure for linear motion units, suitable for a miniaturized linear motion unit in which forming bolt-inserting holes in a track rail is difficult or not preferable, not requiring to make bolt and screw inserting holes in the track rail, capable of firmly fixing the track rail on a mounting base, preferably applicable to a narrow elongated track rail, capable of preventing the occurrence of warpage and bend of a track rail, and capable in some cases of eliminating the warpage and bend occurring in the track rail.

Another object of the present invention is to provide a track rail fixing structure for linear motion units, having a track rail provided with raceway grooves in both of longitudinal side wall surfaces, a slider which is provided with a casing with raceway grooves opposed to those in the track rail, and rolling elements adapted to roll between these raceway grooves, and which saddles on and moves relatively to the track rail, and a mounting base on which the track rail is fixed, characterized in that the mounting base is provided with a groove in which the track rail is installed, both side walls of the track rail installation groove in the mounting base being provided with first locking portions, both side wall surfaces of the track rail being provided with second locking portions, the second locking portions being engaged with the first locking portions, whereby the track rail is fixed on the mounting base.

The first locking portions are formed so as to constitute cross-sectionally arcuate or angular projections extending in the longitudinal direction of the track rail installation groove, while the second locking portions are formed so as to constitute cross-sectionally arcuate or angular recesses engageable with these projections and extending in the longitudinal direction of the track rail installation groove.

Or, the first looking portions are formed so as to constitute cross-sectionally arcuate or angular recesses extending in the longitudinal direction of the track rail installation groove, while the second locking portions are formed so as to constitute cross-sectionally arcuate or angular projections engageable with these recesses and extending in the longitudinal direction of the track rail installation groove.

The track rail installation groove formed in the mounting base is provided on a bottom surface thereof with a projection which a lower surface of the track rail contacts.

Or, a dovetail is formed on an upper surface of the mounting base, and a longitudinally extending dovetail groove in a lower surface of the track rail, the dovetail being fitted in the dovetail groove, whereby the track rail can be fixed on the mounting base.

In this track rail fixing structure, the track rail is installed in the track rail installation groove formed in the mounting base, and then fixed firmly therein. When the track rail is a miniaturized one, it is not necessary that small holes through which bolts and screws are inserted be made in the track rail, and that small track rail fixing screws having specifications including a screw diameter of not more than 2 mm (not more than M2) be used. This enables the track rail to be fixed firmly on the mounting base, and a decrease in the strength of the track rail to be prevented. Namely, unlike a conventional structure of this kind in which the strength of a track rail is spoiled due to the bolt and screw holes formed therein, a strength problem does not arise. Moreover, making holes of a small diameter in the track rail can be rendered unnecessary, and the construction of the track rail can be simplified.

Since the track rail is fitted tightly in the track rail installation groove in the mounting base, the warpage and bend of the track rail are corrected by this groove, or the warpage and bend of the track rail do not occur. Especially, when the track rail has a large length, it can be maintained in excellent condition at all times without warpage and bend occurring thereon. Since warpage and bend do not occur on the track rail, projections and recesses do not occur in regions to be sealed between the track rail and slider. Therefore, the sealed condition between the track rail and slider can be kept excellent, and the sealability of the track rail and slider is improved. Since small bolt and screw tightening operations can be omitted, the assembling cost can be reduced.

In this track rail fixing structure of another mode, a dovetail is formed in the upper surface of the mounting base, and a dovetail groove in the track rail. Therefore, a load imparted to the track rail can be supported on the upper surface of the mounting base, and a large load can be supported. Since the dovetail groove in the track rail is fitted firmly around the dovetail on the mounting base, the track rail can be fixed on the mounting base with the warpage and bend of the former corrected, and the occurrence of warpage and bend of the track rail can be prevented.

In this track rail fixing structure, a first locking portion is formed by a pressure member and a pre-load application means which are made separately from the mounting base, and the pressure member and pre-load application means are inserted in a longitudinally extending groove formed in the portion of one side wall of the track rail installation groove which corresponds to the projection or recess mentioned above, the pressure member being pressed by the pre-load application means against the relative recess or projection in or on the track rail. Accordingly, a high processing accuracy of the track rail and the track rail installation groove in the mounting base is not required, and, owing to the pressure member, the track rail can be fixed on the mounting base firmly and reliably. Namely, the pressure member is pressed against the track rail by a resilient force of the pre-load application means, and the track rail is held reliably by the mounting base, so that play does not occur between the track rail and mounting base. In this case, the pre-load application means can be formed by a spring for applying a resilient force to the pressure member, and an adjusting screw capable of adjusting the resilient force of the spring, so that the resilient force of the pressure member against the track rail can be regulated properly.

In this track rail fixing structure, a dovetail is formed on the upper surface of the mounting base, and a load imparted to the track rail is supported on the upper surface of the base. Accordingly, this structure can be used for reciprocatingly moving an object of a large load. Since the dovetail groove in the track rail is fitted around the dovetail on the mounting base, the warpage and bend of the track rail are corrected.

DETAILED DESCRIPTION OF THE EMBODIMENTS

Embodiments of the track rail fixing structure for linear motion units according to the present invention will now be described with reference to the drawings. Since a linear motion unit, to which the embodiments of this track rail fixing structure are applied, basically has parts corresponding to those of the conventional linear motion rolling guide unit shown in FIGS. 12–14, the parts corresponding to those shown in FIGS. 12–14 are designated by the same reference numerals in the drawings with reference to which these embodiments are to be described.

Figure 1:
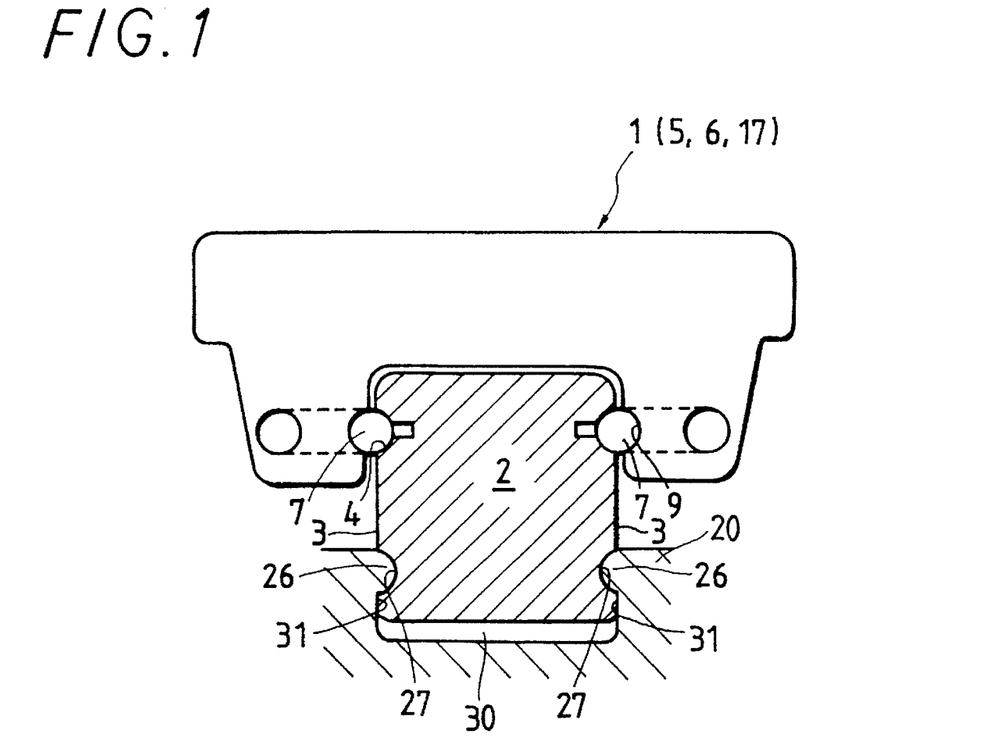
FIG. 1 is a sectional view of an embodiment of the track rail fixing structure for linear motion units according to the present invention.

FIG. 1 shows an embodiment of the track rail fixing structure according to the present invention. In this track rail fixing structure, a slider 1 saddles on a track rail 2, which is fixed on a mounting base 20, in the same manner as a slider in a conventional linear motion rolling guide unit, and is moved longitudinally on and relatively to the track rail 2. The track rail 2 is provided with raceway grooves 4 in both of its longitudinal wall surfaces 3, and longitudinally extending locking portions in the parts thereof which are below the raceway grooves 4 so as to extend in parallel therewith. The slider 1 is provided with a casing 5 having raceway grooves 9 opposed to the raceway grooves 4, and rolling elements 7 adapted to roll between the raceway grooves 4, 9. The locking portions are constituted of cross-sectionally arcuate grooves, i.e. recesses 27 in the embodiment of FIG. 1. A mounting base 20 is provided with a groove 30 for installing the track rail 2 therein. The track rail installation groove 30 is provided on its both side walls 31 with cross-sectionally arcuate projections 26 constituting first locking portions and formed so as to extend in the longitudinal direction of the track rail 2. The track rail 2 is provided in its both side wall surfaces 3 with cross-sectionally arcuate grooves 27 constituting second locking portions in which the projections 26 are fitted, and extending in the longitudinal direction of the track rail 2. The track rail 2 is fixed on the mounting base 20 by inserting a lower portion of the former in the track rail installation groove 30 formed in the latter.

Figure 2:
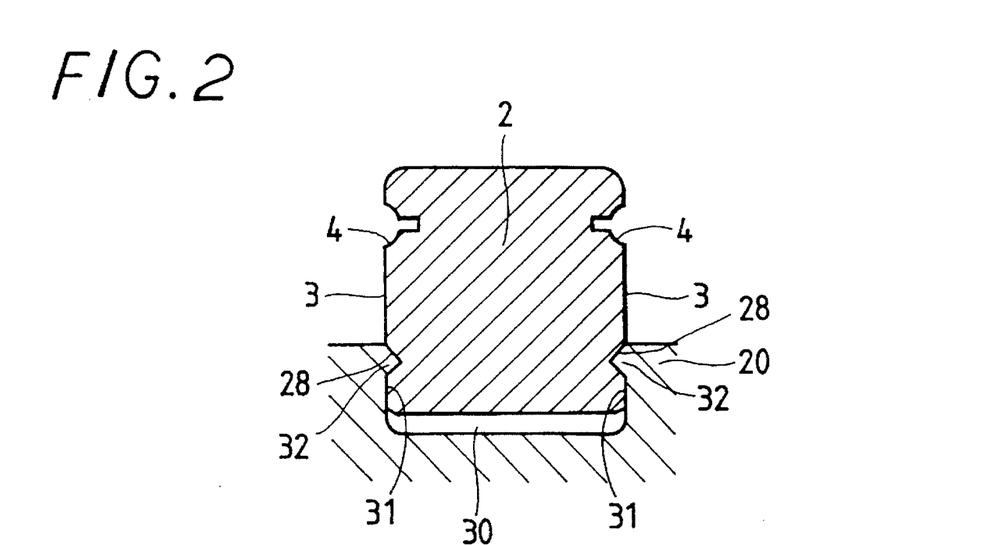
FIG. 2 is a sectional view of another embodiment of the track rail fixing structure for linear motion units according to the present invention.

FIG. 2 shows another embodiment of the track rail fixing structure according to the present invention. A track rail 2 is provided in its both side wall surfaces 3 with cross-sectionally angular grooves 28, which constitute second locking portions, formed so as to extend in the longitudinal direction of the track rail 2. The mounting base 20 is provided on its both side walls 31 with cross-sectionally angular projections 32, which constitute first locking portions, formed so as to extend in the longitudinal direction of the track rail 2. The track rail 2 is fixed on the mounting base 20 by fitting the projections 32 of the latter in the grooves 28 in the former. In the embodiment of FIG. 2, the grooves 28 and projections 32 are formed to such cross-sectionally triangular shapes that are in conformity with each other.

Figure 3:
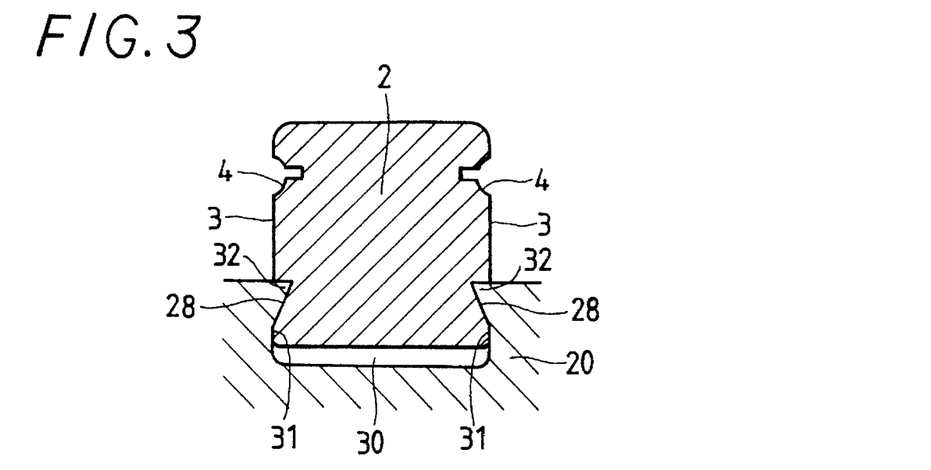
FIG. 3 is a sectional view of still another embodiment of the track rail fixing structure for linear motion units according to the present invention.

FIG. 3 shows still another embodiment of the track rail fixing structure according to the present invention. The projections 32, which constitute first locking portions, formed on side wall surfaces 31 of a track rail installation groove 30 in a mounting base 20 have horizontal upper surfaces projecting toward the central portion of the groove 30, while the cross-sectionally triangular grooves, which constitute second locking portions, formed in both of longitudinally extending side wall surfaces 3 of a track rail 2 have horizontal upper sides. In this embodiment, in other words, in this track rail fixing structure having a kind of dovetail and a kind of dovetail groove, a dovetail is formed on a lower portion of the track rail 2, and a dovetail groove in the mounting base 20.

Figure 4:
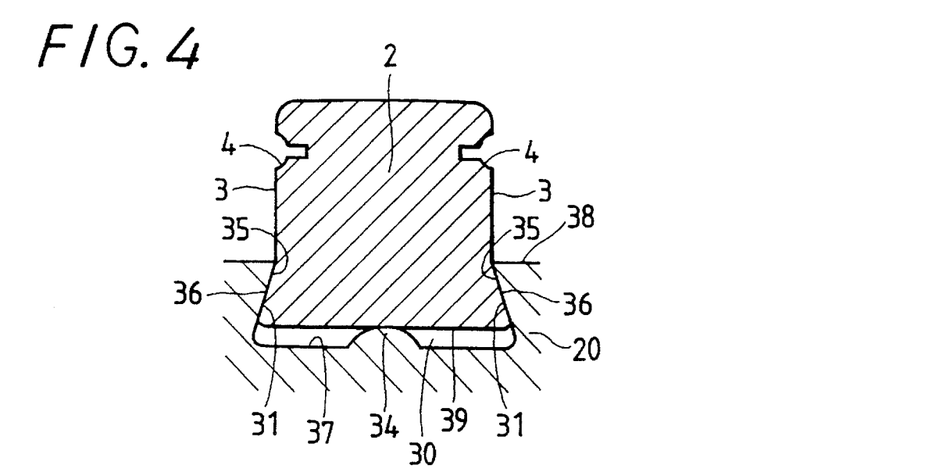
FIG. 4 is a sectional view of a further embodiment of the track rail fixing structure for linear motion units according to the present invention.

FIG. 4 shows a further embodiment of the track rail fixing structure according to the present invention. A mounting base 20 is provided with a groove 30 in which a track rail 2 is installed. The mounting base 20 is provided on both side walls 31 of the track rail installation groove 30 with inclined surfaces 35 constituting first locking portions and extending divergently from an upper surface 38 toward a bottom surface 37. The track rail 2 is provided on both of longitudinally extending side wall surfaces 3 with inclined surfaces 36 constituting second locking portions and having cross-sectional shapes in conformity with those of the inclined surfaces 35 of the mounting base 20, i.e. extending divergently toward a bottom surface thereof. In this embodiment, in other words, in this track rail fixing structure having a kind of dovetail and a kind of dovetail groove, it can be said that the dovetail is formed on a lower portion of the track rail 2, and that the dovetail groove is formed in the mounting base 20. Moreover, a support projection 34 of an arbitrary shape constituting a support member for a bottom surface 39 of the track rail 2 can be formed on the bottom surface 37 of the track rail installation groove 30 in the mounting base 20 so as to extend in the longitudinal direction thereof. Although such a support projection is not illustrated on the bottom surfaces of the mounting bases 20 shown in FIGS. 1–3, it may be provided on the bottom surfaces of the mounting bases 20 in the embodiments of these drawings.

Figure 5:
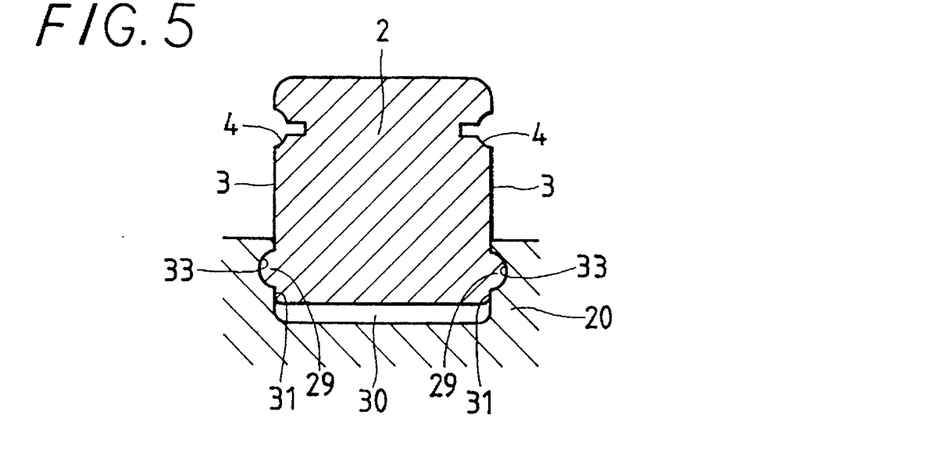
FIG. 5 is a sectional view of still further embodiment of the track rail fixing structure for linear motion units according to the present invention.

FIG. 5 shows still further embodiment of this track rail fixing structure. A track rail 2 is provided with raceway grooves 4 in both of longitudinal side wall surfaces 3 thereof, and a lower portion of the track rail 2 is set in a groove 30 in a mounting base 20. Both side walls 31 of the track rail installation groove 30 in the mounting base 20 are provided with cross-sectionally arcuate grooves 33, which constitute first locking portions, in such a manner that the grooves 33 extend in the longitudinal direction of the base 20. Both of longitudinal side wall surfaces 3 of the track rail 2 are provided with longitudinally extending cross-sectionally arcuate projections 29 engageable with the grooves 33 and constituting second locking portions.

Figure 6:
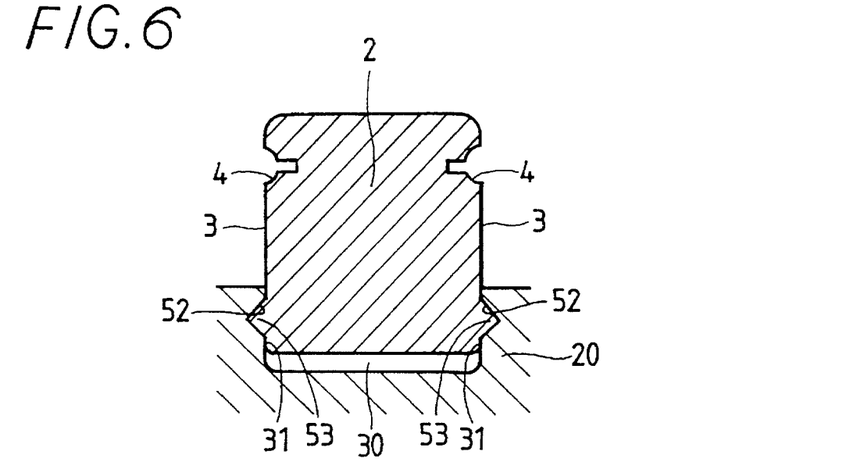
FIG. 6 is a sectional view of another embodiment of the track rail fixing structure for linear motion units according to the present invention.

FIG. 6 shows another embodiment of this track rail fixing structure. A track rail 2 is provided with raceway grooves 4 in both of longitudinal side wall surfaces 3, and a lower portion of the track rail 2 is set in a groove 30 in a mounting base 20. Both side walls 31 of the track rail installation groove 30 in the mounting base 20 are provided with cross-sectionally angular (cross-sectionally triangular grooves in FIG. 6) grooves 52, which constitute first locking portions, in such a manner that the grooves 52 extend in the longitudinal direction of the base 20. Both of longitudinal side wall surfaces 3 of the track rail 2 are provided with longitudinally extending cross-sectionally angular (cross-sectionally triangular projections in FIG. 6) projections 53 engageable with the grooves 52 and constituting second locking portions.

Regarding the track rail fixing structures for linear motion units, the projections and grooves on and in the track rails 2 and mounting bases 20 described with reference to FIGS. 1–3 and 5–6 are formed as longitudinally extending projections and grooves, and they may also be formed plurally on and in each track rail 2 and mounting base 20. The shapes of the grooves and projections are, of course, not limited as long as the grooves and projections are formed engageably. When a plurality of grooves and projections are formed on and in or in and on each track rail and mounting base, the depth of the grooves and the height of the projections may be set smaller.

Figure 7:
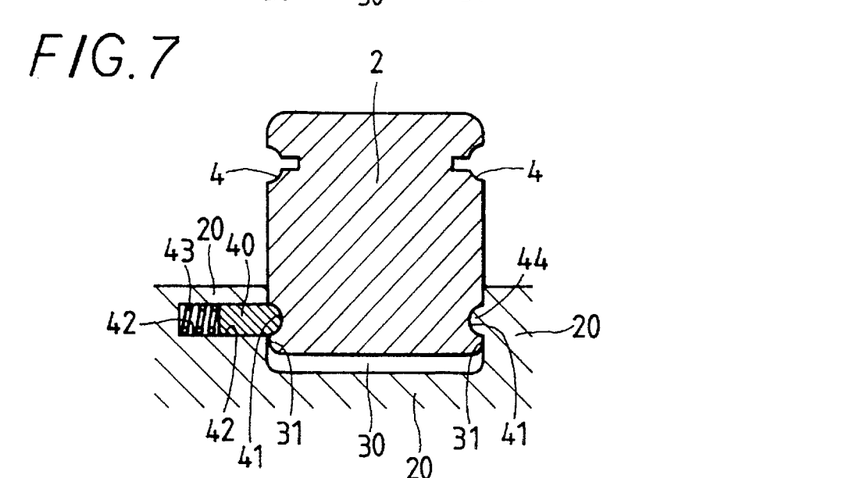
FIG. 7 is a sectional view of still another embodiment of the track rail fixing structure for linear motion units according to the present invention.

FIG. 7 shows another embodiment of the track rail fixing structure according to the present invention. A track rail 2 is provided with raceway grooves 4 in both of longitudinal side wall surfaces 3, and a lower portion of the track rail 2 is set in a groove 30 in a mounting base 20. A first locking portion for fixing the track rail 2 is formed by a pressure member 40 separately from the mounting base 20. A locking groove 42 is formed in at least one side wall 31 of the track rail installation groove 30 in the mounting base 20. A spring 43 and pressure member 40 are inserted as pre-load application means in the looking groove 42. As shown in this drawing, a projection 44 constituting a first locking portion is provided in the other side wall 31 of the track rail installation groove 30 in the mounting base 20. The track rail 2 is provided in its both side surfaces with grooves 41 which constitute second locking portions. In order to fix the track rail 2 on the mounting base 20 in this embodiment, the pressure member 40 is forced into the locking groove 42 against the resilient force of the spring 43, and the track rail 2 is then inserted into the groove 30 in the mounting base 20. Accordingly, when the track rail 2 is in a fixed state with respect to the mounting base 20, a pre-load is imparted to the track rail 2 via the pressure member 40 owing to the resilient force of the spring 43 to cause the track rail 2 to be pressed against the side wall surface 31 of the mounting base 20, so that the track rail 2 set in the groove 30 in the mounting base 20 does not play. Although the pressure member 40 can be formed out of a metal, it can also be formed out of an elastic material, such as a synthetic resin and a metal if occasion demands.

Figure 8:
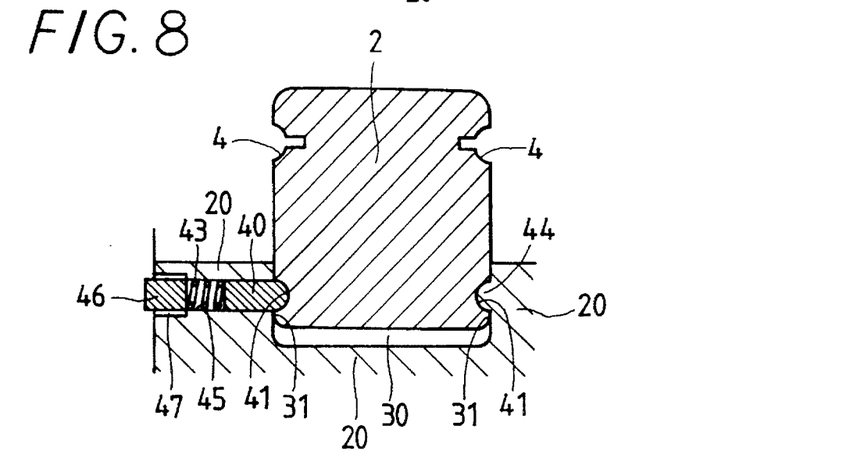
FIG. 8 is a sectional view of a further embodiment of the track rail fixing structure for linear motion units according to the present invention.

FIG. 8 shows still another embodiment of the track rail fixing structure according to the present invention. Since it has the same construction as the embodiment of FIG. 7 except that it has a structure capable of regulating the resilient force of a spring, the same parts are designated by the same reference numerals, and the duplication of descriptions thereof is omitted. In the embodiment of FIG. 8, a through bore 45 is formed in at least one side wall 31 of a track rail installation groove 30 in a mounting base 20, and a thread 47 in one end portion of the through bore 45. A spring 43 and a pressure member 40 are inserted as pre-load application means in the through bore 45. An adjusting screw 46 is driven into the thread 47 so as to force the pressure member 40 inward thereby via the spring 43, so that the track rail 2 is pressed against the side wall 31 of the groove 30, whereby a pre-load can be imparted to the track rail 2. In order to fix the track rail 2 on the mounting base 20 in this embodiment, the adjusting screw 46 is loosened or removed from the thread 47 so as to retract the pressure member 40 into the through bore 45. The track rail 2 is then inserted into the track rail installation groove 30 and positioned in a predetermined position, and the adjusting screw 46 is thereafter driven into the thread 47 so as to force the pressure member 40 into a groove 41 by a resilient force of the spring 43. Accordingly, when the track rail 2 is in a fixed state with respect to the mounting base 20, a pre-load is imparted to the track rail 2 via the pressure member 40 owing to the resilient force of the spring 43 to cause the track rail 2 to be pressed against the other side wall surface 31 of the mounting base 20. During this time, the pre-load can be regulated properly by regulating an amount of turning of the adjusting screw into the thread 47, and the track rail 2 set in the groove 30 in the mounting base 20 does not play.

Figure 9:
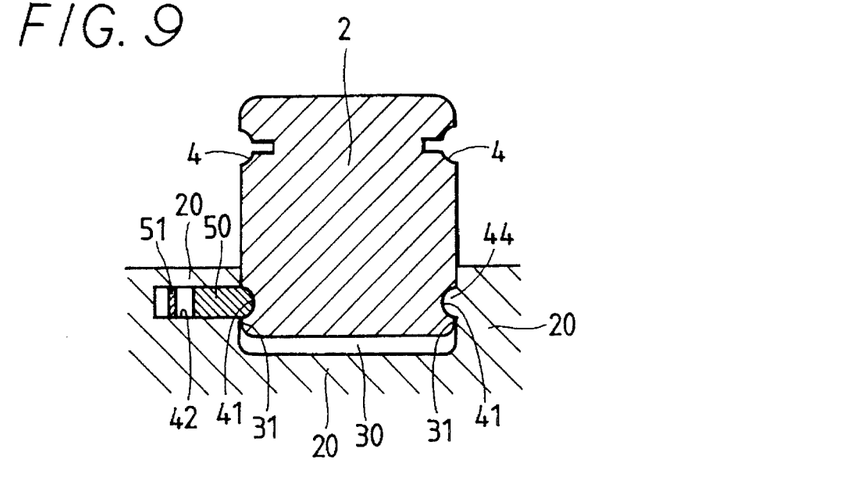
FIG. 9 is a sectional view of still further embodiment of the track rail fixing structure for linear motion units according to the present invention.
Figure 10:
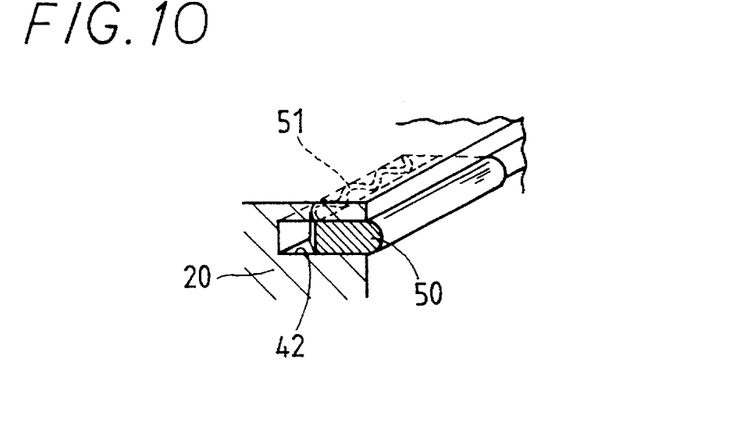
FIG. 10 is an enlarged view of a principal portion of the track rail fixing structure for linear motion units shown in FIG. 9.

FIGS. 9 and 10 show a further embodiment of the track rail fixing structure according to the present invention. Although a coiled spring is shown as the spring constituting the pre-load application means in the embodiment of FIGS. 7 or 8, it may consists of a plate spring or a corrugated spring 51 as shown in FIG. 9 or 10. The plate spring 51 can be formed so that it extend along and in the longitudinal direction of a track rail installation groove 30. In this case, a pressure member 50 is also formed so as to extend along and in the longitudinal direction of the groove 30. The function of this embodiment is identical with that of the embodiment shown in FIGS. 7 or 8.

Figure 11:
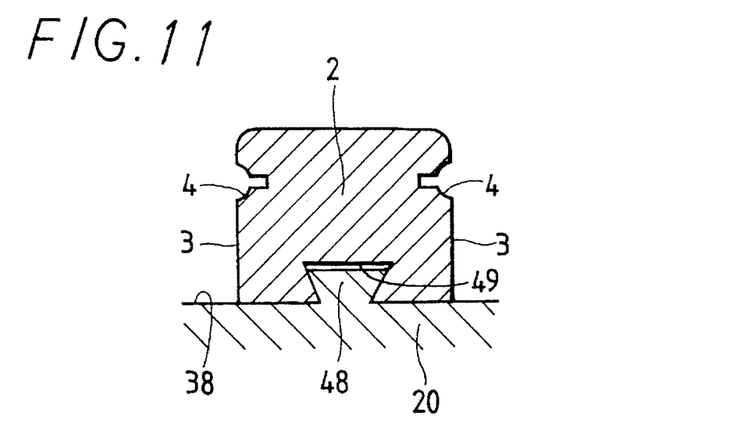
FIG. 11 is a sectional view of another embodiment of the track rail fixing structure for linear motion units according to the present invention.

FIG. 11 shows still further embodiment of the track rail fixing structure according to the present invention. This track rail fixing structure is formed so that it is provided with a track rail 2 having raceway grooves 4 in both of longitudinal side wall surfaces 3 thereof, a casing 5 having raceway grooves 9 opposed to the raceway grooves 4, rolling elements 7 adapted to roll between the raceway grooves 4, 9, a slider 1 saddling on the track rail 2 and moving relatively thereto, and a mounting base 20 on which the track rail 2 is fixed, and, especially, it includes a longitudinally extending dovetail groove 49 formed in a lower surface of the track rail 2, and a dovetail groove 48 formed on an upper surface of the mounting base 20 and adapted to be fitted in the dovetail groove 49 and fix the track rail 2 on the mounting base 20. Therefore, the track rail 2 is fixed on the mounting base 20 by fitting the dovetail groove 49 in the former around the dovetail 48 on the latter. The dovetail 48 and dovetail groove 49 may have, for example, a cross-sectionally circular shape, and the shape thereof is not limited to those shown in the drawings.

What is claimed is:

1. A track rail fixing structure for linear motion units, which comprises:

a track rail provided with raceway grooves in both of longitudinal side wall surfaces thereof, a casing provided with raceway grooves opposed to said raceway grooves in said track rail, rolling elements adapted to roll between said raceway grooves, a slider saddling on said track rail and moving relatively thereto, and a mounting base on which said track rail is fixed, said track rail fixing structure being constituted of a longitudinally extending dovetail groove formed in a lower surface of said track rail, and a dovetail formed on an upper surface of said mounting base and fitted in said dovetail groove to fix said track rail on said mounting base.

2. A track rail fixing structure for linear motion units, which comprises:

a track rail provided with raceway grooves in both of longitudinal side wall surfaces thereof, a casing provided with raceway grooves opposed to said raceway grooves in said track rail, rolling elements adapted to roll between said raceway grooves, a slider saddling on said track rail and moving relatively thereto, and a mounting base on which said track rail is fixed, said mounting base being provided with a groove in which said track rail is installed, both side walls of said track rail installation groove in said mounting base being provided with first locking portions, both side wall surfaces of said track rail being provided with second locking portions, said second locking portions being engaged with said first locking portions to enable said track rail to be fixed on said mounting base, and said first locking portions being cross-sectionally arcuate projections extending in the longitudinal direction of said track rail installation groove, said second locking portions being cross-sectionally arcuate grooves extending in the longitudinal direction of said track rail, in which grooves said projections are fitted.

3. A track rail fixing structure for linear motion units, which comprises:

a track rail provided with raceway grooves in both of longitudinal side wall surfaces thereof, a casing provided with raceway grooves opposed to said raceway grooves in said track rail, rolling elements adapted to roll between said raceway grooves, a slider saddling on said track rail and moving relatively thereto, and a mounting base on which said track rail is fixed, said mounting base being provided with a groove in which said track rail is installed, both side walls of said track rail installation groove in said mounting base being provided with first locking portions, both side wall surfaces of said track rail being provided with second locking portions, said second locking portions being engaged with said first locking portions to enable said track rail to be fixed on said mounting base, and said first locking portions being cross-sectionally angular projections extending in the longitudinal direction of said track rail installation groove, said second locking portions being cross-sectionally angular grooves extending in the longitudinal direction of said track rail, in which grooves said projections are fitted.

4. A track rail fixing structure for linear motion units, which comprises:

a track rail provided with raceway grooves in both of longitudinal side wall surfaces thereof, a casing provided with raceway grooves opposed to said raceway grooves in said track rail, rolling elements adapted to roll between said raceway grooves, a slider saddling on said track rail and moving relatively thereto, and a mounting base on which said track rail is fixed, said mounting base being provided with a groove in which said track rail is installed, both side walls of said track rail installation groove in said mounting base being provided with first locking portions, both side wall surfaces of said track rail being provided with second locking portions, said second locking portions being engaged with said first locking portions to enable said track rail to be fixed on said mounting base, and said first locking portions being cross-sectionally arcuate grooves extending in the longitudinal direction of said track rail installation groove, said second locking portions being cross-sectionally arcuate projections extending in the longitudinal direction of said track rail, around which projections said grooves are fitted.

5. A track rail fixing structure for linear motion units, which comprises:

a track rail provided with raceway grooves in both of longitudinal side wall surfaces thereof, a casing provided with raceway grooves opposed to said raceway grooves in said track rail, rolling elements adapted to roll between said raceway grooves, a slider saddling on said track rail and moving relatively thereto, and a mounting base on which said track rail is fixed, said mounting base being provided with a groove in which said track rail is installed, both side walls of said track rail installation groove in said mounting base being provided with first locking portions, both side wall surfaces of said track rail being provided with second locking portions, said second locking portions being engaged with said first locking portions to enable said track rail to be fixed on said mounting base, and said first locking portions being cross-sectionally angular grooves extending in the longitudinal direction of said track rail installation groove, said second locking portions being cross-sectionally angular projections extending in the longitudinal direction of said track rail, around which projections said grooves are fitted.

6. A track rail fixing structure for linear motion units, which comprises:

a track rail provided with raceway grooves in both of longitudinal side wall surfaces thereof, a casing provided with raceway grooves opposed to said raceway grooves in said track rail, rolling elements adapted to roll between said raceway grooves, a slider saddling on said track rail and moving relatively thereto, and a mounting base on which said track rail is fixed, said mounting base being provided with a groove in which said track rail is installed, both side walls of said track rail installation groove in said mounting base being provided with first locking portions, both side wall surfaces of said track rail being provided with second locking portions, said second locking portions being engaged with said first locking portions to enable said track rail to be fixed on said mounting base, and a bottom surface of said track rail installation groove formed in said mounting base being provided with a projection which a lower surface of said track rail contacts.

7. A track rail fixing structure for linear motion units, which comprises:

a track rail provided with raceway grooves in both of longitudinal side wall surfaces thereof, a casing provided with raceway grooves opposed to said raceway grooves in said track rail, rolling elements adapted to roll between said raceway grooves, a slider saddling on said track rail and moving relatively thereto, and a mounting base on which said track rail is fixed, said mounting base being provided with a groove in which said track rail is installed, both side walls of said track rail installation groove in said mounting base being provided with first locking portions, both side wall surfaces of said track rail being provided with second locking portions, said first locking portions being formed by pressure members separately from said mounting base, said pressure members being engaged under pressure with said second locking portions by pre-load application means, said second locking portions being engaged with said first locking portions to enable said track rail to be fixed on said mounting base, and said pre-load application means being comprised of springs adapted to apply a resilient force to said pressure members, and adjusting screws capable of adjusting the resilient force of said springs.

* * * * *